United States Patent [19]

Loctin

[11] Patent Number: 4,729,342
[45] Date of Patent: Mar. 8, 1988

[54] SELF-CLEANING PET TOILET

[76] Inventor: Albert Loctin, 92 rue Antoine Charial, Lyon 3 (Rhône), France

[21] Appl. No.: 885,086

[22] Filed: Jul. 14, 1986

[30] Foreign Application Priority Data

Jul. 12, 1985 [FR] France ............................. 85 11262

[51] Int. Cl.$^4$ ........................................... A01K 29/00
[52] U.S. Cl. ................................................... 119/1
[58] Field of Search ..................... 119/1, 19, 158, 159; 49/25, 31, 168

[56] References Cited

U.S. PATENT DOCUMENTS

| | | | |
|---|---|---|---|
| 3,734,057 | 5/1973 | Lee et al. ......................... | 119/159 X |
| 3,793,989 | 2/1974 | Clark ................................ | 119/19 |
| 3,822,673 | 7/1974 | Benny .............................. | 119/19 X |
| 4,322,913 | 4/1982 | Himmer ........................... | 49/168 |

FOREIGN PATENT DOCUMENTS 2247585 10/1973 France ............................... 119/19

Primary Examiner—Robert P. Swiatek
Assistant Examiner—R. Thomas Price
Attorney, Agent, or Firm—Karl F. Ross; Herbert Dubno; Andrew Wilford

[57] ABSTRACT

An automatic pet toilet has a housing defining a generally closed chamber having a floor and side walls, one of the latter having an opening through which the pet can pass. A door is displaceable on the housing between a closed position blocking the opening and an open position clear of same by means of a door drive motor. A closed-door switch on the housing generates an output only when the door is in its closed position. Floor and wall sprays respectively directed in the chamber at the floor and walls of the chamber are supplied with wash liquid, usually water, by a valve connectable to a source of pressurized liquid. A drain in the floor and a chopper connectable to a waste line receive material washed by the sprays from the walls and floor, comminute the material, and feed it to the waste line. A sensor emits an output when the pet is within the chamber and a controller connected to the chopper, switch, sensor, motor, and valve closes the door and then opens the valve and operates the chopper when a pet has entered and left the chamber with interruption of the beam while in the chamber, and thereafter closes the valve, stops the chopper, and opens the door.

13 Claims, 4 Drawing Figures

SELF-CLEANING PET TOILET

FIELD OF THE INVENTION

The present invention relates to a self-cleaning pet toilet. More particularly this invention concerns a device in which a pet can excrete solid or liquid waste and which then automatically disposes of this waste.

BACKGROUND OF THE INVENTION

In one type of pet toilet described in French Pat. No. 2,247,585 it is possible to spray a wash liquid over the walls and floor of a toilet chamber by pressing a flush button, after of course closing an entrance door to the chamber. Such a system requires that the pet owner take the necessary steps to eliminate any animal waste and, while such manual operation makes the equipment simple and cheap, this arrangement is not good for long-term untended use.

In the system of U.S. Pat. Nos. 2,204,416 and 3,318,285 there is a special door or floor trip that the animal operates to set off the flushing operation. Such arrangements do not do anything more than a simple timed flush of the equipment, and are frequently set off when not necessary, as when for example the animal is merely visiting the box without actually excreting. Moreover such arrangements have such a simple automatic operation that they can be set off while the animal is still inside, or can be set off continuously by a playful pet.

OBJECTS OF THE INVENTION

It is therefore an object of the present invention to provide an improved pet toilet.

Another object is the provision of such a pet toilet which overcomes the above-given disadvantages, that is which operates wholly automatically, but that does not operate when not necessary and that takes the vagaries of pet conduct into account to eliminate unneeded flushings or operation with a pet inside.

SUMMARY OF THE INVENTION

An automatic pet toilet according to the invention has a housing defining a generally closed chamber having a floor and side walls, one of the latter having an opening through which the pet can pass. A door is displaceable on the housing between a closed position blocking the opening and an open position clear of same by means of a door drive motor. A closed-door switch on the housing generates an output only when the door is in its closed position. Floor and wall sprays respectively directed in the chamber at the floor and walls of the chamber are supplied with wash liquid, usually water, by a valve connectable to a source of pressurized liquid. A drain in the floor and a chopper connectable to a waste line receive material washed by the sprays from the walls and floor, comminute the material, and feed it to the waste line. A sensor emits an output when the pet is within the chamber and a controller connected to the chopper, switch, sensor, motor, and valve closes the door and then opens the valve and operates the chopper when a pet has entered and left the chamber with interruption of the beam while in the chamber, and thereafter closes the valve, stops the chopper, and opens the door.

Thus with the system of this invention the automatic washing system is only operated once the pet is clear of the chamber and the door is closed. It is therefore impossible for the spray to go off when the pet is even partially in the chamber. No water will be projected to the interior, and in fact the system holds the door shut during the wash cycle. To this end the door is a slider which the pet cannot open.

The wall spray includes an overhead rotary nozzle connected to the valve. The floor spray is a nozzle open horizontally at the floor level and provided with a drive for oscillating it about an upright axis while spraying the floor. The floor is parallepipedal and has one corner provided with the drain and an opposite corner with the floor spray.

According to another feature of this invention the sensor is a light receiver at one side of the chamber and the system has an emitter for directing a beam from the other side of the chamber across the chamber to the receiver for causing same to emit its output when the beam is uninterrupted, it of course being understood that such output could be the absence as well as the presence of a signal in an output line from the receiver. The beam is an infrared light beam so that it is not seen by the animal, and cannot therefore frighten it.

The controller has a pressure-sensitive switch in the drain and connected to the chopper for operating same only when the drain is filled. Thus the chopper will continue to run as long as there is something to remove from the drain.

The controller of this invention has a timer connected to the sensor for closing the door and opening the valve only when a certain time has elapsed after an animal has entered the chamber and broken the beam and the beam has been uninterrupted continuously during this time. Thus the closing and spraying will only take place when the animal is well clear of the chamber. Similarly the timer only opens the valve when the beam has been continuously uninterrupted for a predetermined time after the door has been closed. This prevents the system from operating if the animal is nearby or if the animal reenters the chamber, avoiding frightening or injuring the pet.

The system of this invention can also have an automatic dispenser for automatically spreading particulate litter material in the chamber after the valve has been closed and the chopper has stopped. The system can further have another automatic dispenser for automatically injecting a dose of deodorant into the chamber after the valve has been closed and the chopper has stopped.

For most economical use, for instance when the system is used in a public place like an apartment building, the controller includes a counter for initiating the cycle of door closing, spraying, chopping, and door opening after a predetermined number of times the output has been emitted, whereby the toilet only flushes automatically after the predetermined number of visits by the pet.

In addition according to the invention the timer only initiates the cycle of door closing, spraying, chopping, and door opening when the output has been interrupted by the pet for a time period shorter than a predetermined maximum time period. This is based on the discovery that a pet who urinates or defecates normally spends a relatively short time in the toilet chamber, arriving, doing his business, and leaving in much less than a minute, while a pet who is just roaming about or who even sleeps in the chamber, which is not unknown, will spend much more time. Thus the system of this invention distinguishes between these long visits which necessitate no cleanup and shorter visits requiring an automatic flush.

DESCRIPTION OF THE DRAWING

The above and other features and advantages will become more readily apparent from the following, reference being made to the accompanying drawing in which.

SPECIFIC DESCRIPTION

Figure 1:
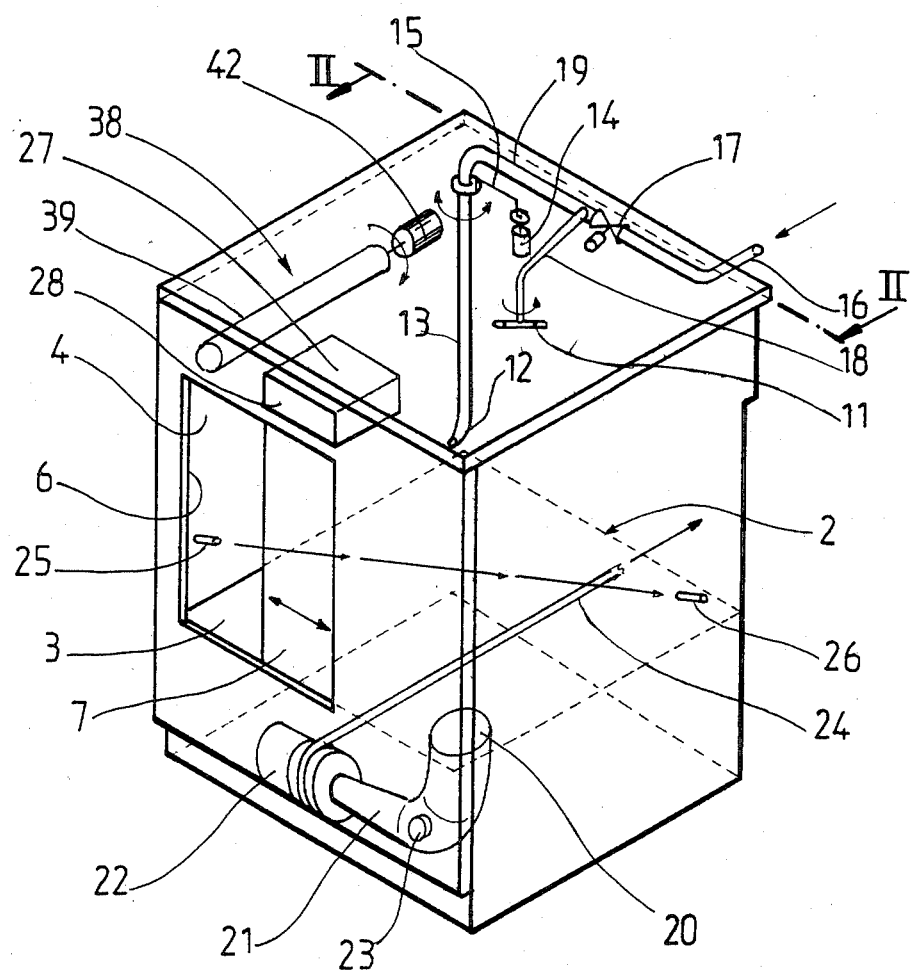
FIG. 1 is a perspective and partly diagrammatic view of the pet toilet according to this invention.
Figure 2:
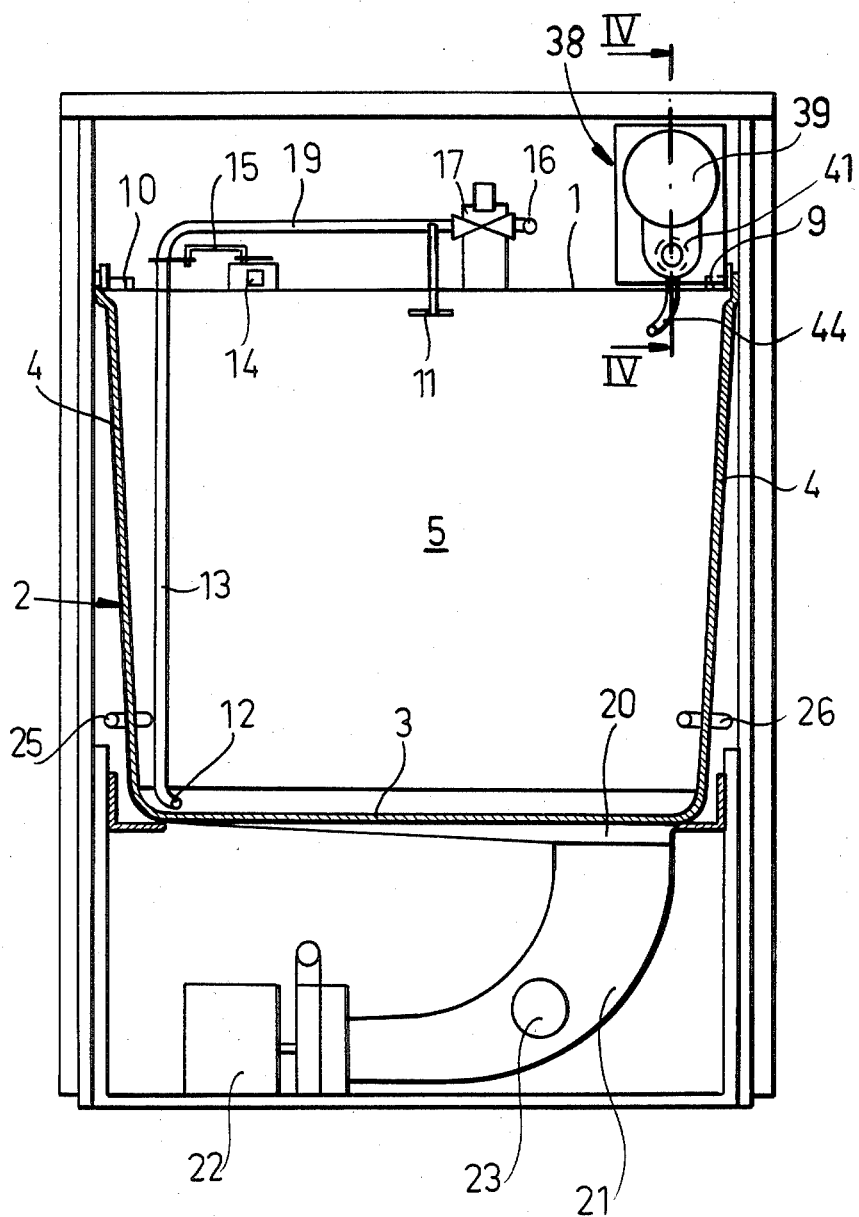
FIG. 2 is a vertical section taken along the plane indicated at II—II in FIG. 1.

As seen in FIGS. 1 and 2 of the drawing, a housing top wall 1 defines with a tub or basin 2 having a floor 3 and side walls 4 a mainly closed toilet chamber 5. One of these side walls 4 and the respective housing side wall are formed with an opening 6 blockable by a sliding door 7 large enough for entry and egress of the pet in question. A motor 8 shown schematically only in FIG. 3 can slide the door 7 between open and closed positions detected by switches 9 and 10. The external appearance of the assembly can be that of a standard kitchen cabinet for integration of the pet toilet into such cabinetry.

A rotary nozzle 11 at the top of the chamber 5 can spray the walls 4 of same with wash water. The floor 3 can be washed by water sprayed from the lower nozzle end 12 of a vertical pipe 13 that is oscillated about its vertical axis by a motor 14 connected via a crank linkage 15 to the pipe 13. An incoming pressurized water line 16 is connected via a solenoid valve 17 and pipes 18 and 19 to the nozzle 11 and pipe 13. The floor 3 of the chamber 5 pitches slightly down to a rear corner drain 20 diagonally opposite the pipe 13 and connected via a large-diameter waste pipe 21 to a chopper 22 operated by a pressure switch 23 and thence to a small-diameter outgoing drain line 24.

Figure 3:
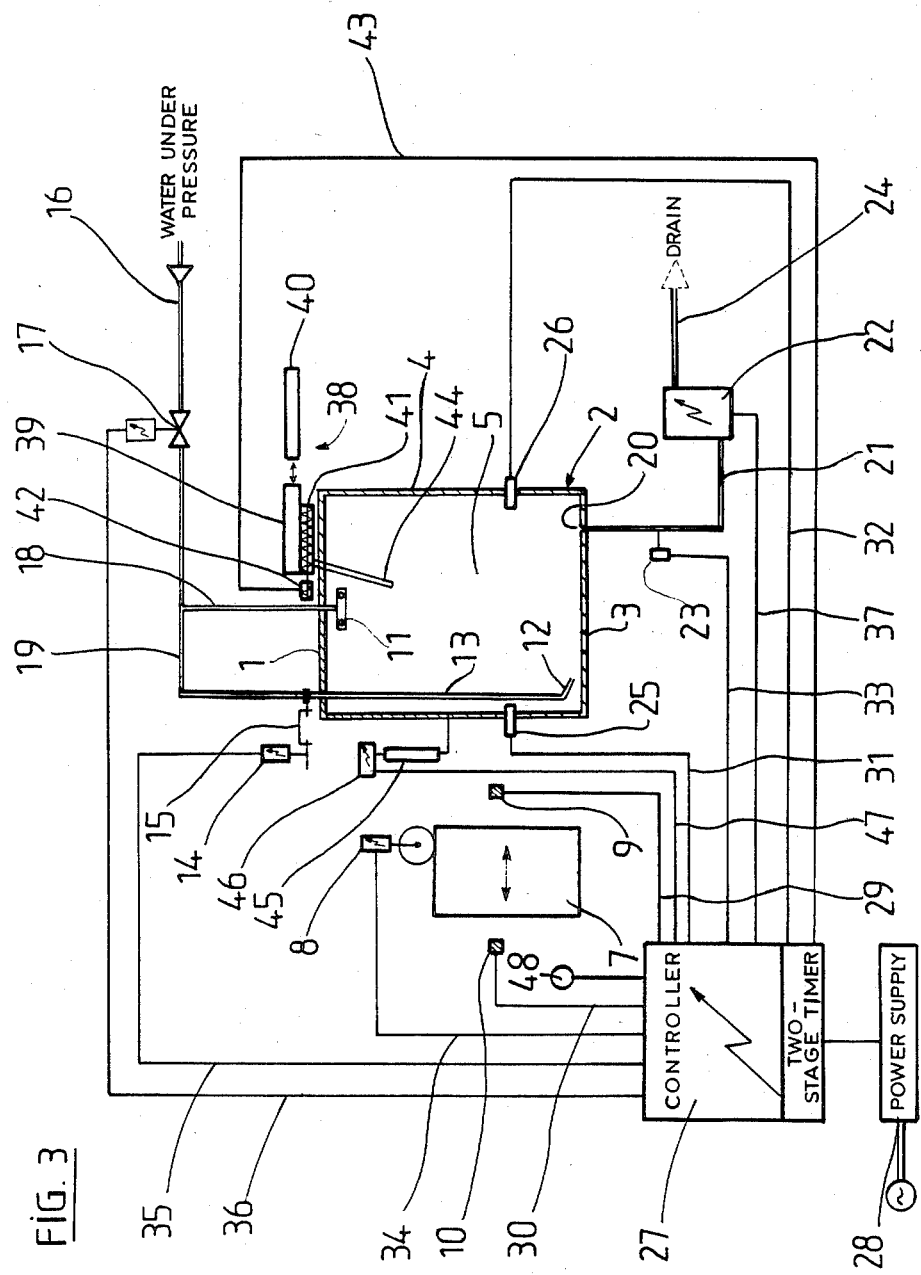
FIG. 3 is a small-scale mainly schematic illustration of the toilet, particularly detailing the control system.

As seen in FIG. 3 a controller 27 powered from a supply 28 is connected via lines 31 and 32 to an infrared emitter 25 and detector 26 situated at diagonally opposite corners of the chamber 5 at an appropriate distance above the floor 3 for interruption of the infrared beam by the pet in question. Further control lines 29, 30, 33, 34, 35, 36, and 37 connect the controller 27 to the switch 9, the switch 10, the pressostat 23, the motor 8, the motor 14, the valve 17, and the pump 22, respectively.

Figure 4:
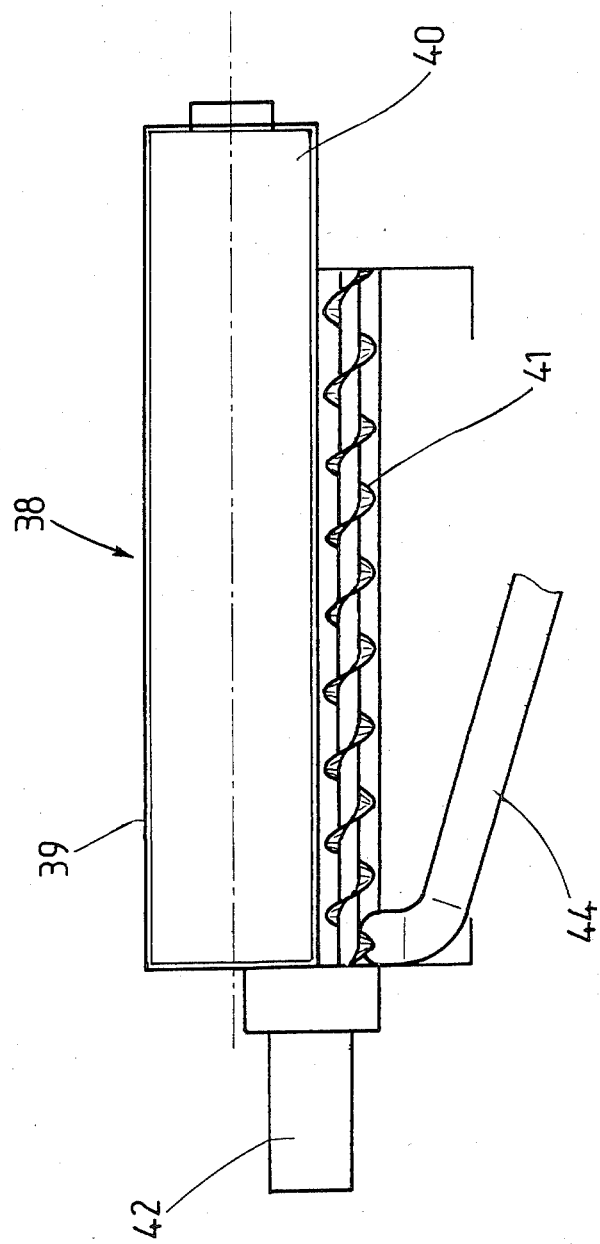
FIG. 4 is a large-scale section taken along line IV—IV of FIG. 2.

As best seen in FIG. 4 a litter dispenser 38 at the top of the chamber 5 opposite the drain 20 has a holder 39 for a canister 40 of grindable litter of biodegradable and grindable sand-like particles. A feed auger 41 operated by a drive motor 42 connected via a line 43 to the controller 27 advances the litter to the upper end of a distributing pipe 44.

Similarly as seen in FIG. 3 a cartridge 45 of deodorizing gas can be operated by a valve 46 connected via a line 47 to the controller 27 to spray this gas into the chamber 5.

Once the power supply 28 is connected to the electric source, the line 16 is connected to a pressurized water line, and the line 24 is connected to a drain, the device operates automatically as follows:

When not in use the door 7 is open to unblock the opening 6, the valve 17 is closed, the motors 8, 14, and 42 are stationary, and the chopper 22 is not working. The infrared source 25 and the controller 27 are, however, energized and operating.

The receiver 26 sends out an output when the beam from the source 25 is cut by a dog or cat that enters the chamber 5 via the opening 6. When this beam is cut a timer in the controller 27 is started so the system can determine whether the animal is there a short time to urinate or defecate, or a long time to sleep. In the latter case, that is when the visit has been long so that it is fairly certain that the animal performed no toilet functions, when the animal subsequently leaves the system merely returns to the ready mode.

If, however, the timer of the controller 27 determines that the visit was short, indicating with some certainty that the chamber 5 needs cleaning, the motor 8 is first operated to shut the door 7. This is only done after the beam between the source 25 and the receiver 26 remains uninterrupted for more than a minute, indicating for sure the animal is out of the container and not just momentarily out of the beam.

The door 7 is then closed by the motor 8 and once the door-closed switch 10 is actuated another waiting period is started. If somehow the animal is in the chamber 5 but out of the beam, the animal will certainly bolt for the opening 6 or at least stand up when the door 7 closes, thereby interrupting the beam and causing the controller 27 to reopen the door.

If the beam remains uninterrupted during this second waiting period, the controller 27 opens the valve 17 and energizes the motor 14. This sprays the walls 4 by setting the nozzle 11 spinning while oscillating the pipe 13 through 90° to wash anything on the walls 4 or floor 3 to the drain 20 and down into the pipe 21. Once the pipe 21 starts to fill, the pressostat 23 signals this condition and the controller 27 starts the chopper to grind up and convey away all the material thus flushed down the drain hole 20.

After a predetermined such rinse period the valve 18 is closed and the motor 14 deenergized. The chopper 22 continues to run, however, until the pipe 21 is empty, and then the pressostat 23 shuts it down also. Then the motor 42 is actuated to strew some litter from the cartridge 40 in the chamber 5 and the valve 46 opened to spray some deodorant over the litter in the chamber 5. The infrared barrier is interrupted by such dropping of the litter, indicating that there is still some in the carriage. If the actuation of the motor 42 is not accompanied by a breaking of the light curtain, the controller will illuminate a warning lamp 48 to indicate this condition.

Thereupon the motor 8 moves the door to the open position, closing the switch 9 that resets the system for another wholly new cycle.

The system can also be programmed so that it only does such a cleaning of the chamber after a predetermined number of such visits to the chamber 5, in which case more litter might be dispensed with each wash cycle.

I claim:

1. An automatic pet toilet comprising:
   a housing defining a generally closed chamber having a top wall, a floor, and side walls, one of the side walls having an opening through which the pet can pass, the other walls and floor being substantially closed;

a door displaceable on the housing between a closed position blocking the opening and an open position clear of same;

means including a door drive motor in the housing for displacing the door between its positions;

means including a closed-door switch on the housing for indicating when the door is in its closed position;

floors and wall sprays respectively directed in the chamber at the floor and side walls of the chamber;

a valve connectable to a source of pressurized liquid, connected to the sprays, and openable to feed the liquid under pressure to the sprays;

means including a drain in the floor and a chopper connectable to a waste line for receiving material washed by the sprays from the walls and floor, comminuting the material, and feeding it to the waste line;

sensors means for generating a beam traversing the chamber for emitting an output when the pet is within the chamber; and control means connected to the chopper, switch, sensor means, motor, and valve for normally maintaining the door in open position and for closing the door and then opening the valve and operating the chopper only after a pet has entered and left the chamber with interruption of the beam while in the chamber, and for thereafter closing the valve, stopping the chopper, and opening the door.

2. The automatic pet toilet defined in claim 1 wherein the wall spray includes an overhead rotary nozzle connected to the valve.

3. The automatic pet toilet defined in claim 1 wherein the floor spray is a nozzle open horizontally at the floor level and provided with means for oscillating it about an upright axis while spraying the floor.

4. The automatic pet toilet defined in claim 3 wherein the floor is parallepipedal and has one corner provided with the drain, the floor spray being in the opposite corner.

5. The automatic pet toilet defined in claim 1 wherein the sensor means includes:

a light receiver at one side of the chamber offset from the door inside the chamber;

means inside the chamber for directing the beam from the other side of the chamber across the chamber offset from the door to the receiver for causing same to emit the output when the beam is interrupted.

6. The automatic pet toilet defined in claim 5 wherein the beam is infrared.

7. The automatic pet toilet defined in claim 1 wherein the control means includes timer means connected to the sensor means for closing the door and opening the valve only when a certain time has elapsed after an animal has entered the chamber and broken the beam and the beam has been subsequently restored and uninterrupted continuously during this time, whereby the closing and spraying will only take place when the animal is well clear of the chamber.

8. The automatic pet toilet defined in claim 7 wherein the timer means further only opens the valve when the beam has been continuously uninterrupted for a predetermined time after the door has been closed.

9. The automatic pet toilet defined in claim 1, further comprising means for automatically injecting a dose of deodorant into the chamber after the valve has been closed and the chopper has stopped.

10. The automatic pet toilet defined in claim 1 wherein the control means includes a counter for initiating the cycle of door closing, spraying, chopping, and door opening after a predetermined number of times the output has been emitted, whereby the toilet only flushes automatically after the predetermined number of visits by the pet.

11. An automatic pet toilet comprising:

a housing defining a generally closed chamber having a floor and side walls, one of the side walls having an opening through which the pet can pass;

a door displaceable on the housing between a closed position blocking the opening and an open position clear of same;

means including a door drive motor in the housing for displacing the door between its positions;

means including a closed-door switch on the housing for indicating when the door is in its closed position;

floor and wall sprays respectively directed in the chamber at the floor and walls of the chamber;

a valve connectable to a source of pressurized liquid, connected to the sprays, and openable to feed the liquid under pressure to the sprays;

means including a drain in the floor and a chopper connectable to a waste line for receiving material washed by the sprays from the walls and floor, comminuting the material, and feeding it to the waste line;

sensor means for emitting an output when the pet is within the chamber;

control means connected to the chopper, switch, sensor means, motor, and valve for closing the door and then opening the valve and operating the chopper when a pet has entered and left the chamber with interruption of the beam while in the chamber, and for thereafter closing the valve, stopping the chopper, and opening the door; and means including a pressure-sensitive switch in the drain and connected to the chopper for operating same only when the drain is filled.

12. An automatic pet toilet comprising:

a housing defining a generally closed chamber having a floor and side walls, one of the side walls having an opening through which the pet can pass;

a door displaceable on the housing between a closed position blocking the opening and an open position clear of same;

means including a door drive motor in the housing for displacing the door between its positions;

means including a closed-door switch on the housing for indicating when the door is in its closed position;

floor and wall sprays respectively directed in the chamber at the floor and walls of the chamber;

a valve connectable to a source of pressurized liquid, connected to the sprays, and openable to feed the liquid under pressure to the sprays;

means including a drain in the floor and a chopper connectable to a waste line for receiving material washed by the sprays from the walls and floor, comminuting the material, and feeding it to the waste line;

sensor means for emitting an output when the pet is within the chamber;

control means connected to the chopper, switch, sensor means, motor, and valve for closing the door and then opening the valve and operating the chopper when a pet has entered and left the chamber with interruption of the beam while in the chamber, and for thereafter closing the valve, stopping the chopper, and opening the door; and means for automatically spreading particulate litter material in the chamber after the valve has been closed and the chopper has stopped.

13. The automatic pet toilet defined in claim 12 wherein the sensor also generates its output when the particulate material is dispensed, the toilet further comprising a signal lamp illuminated by the control means when the sensor does not detect dropping of the material on operation of the dispenser, whereby when the material supply is exhausted the lamp will be lighted.

* * * * *